Jan. 16, 1934.　　　O. H. GALLAMORE　　　1,943,791
FLEXIBLE COUPLING
Filed Dec. 19, 1930
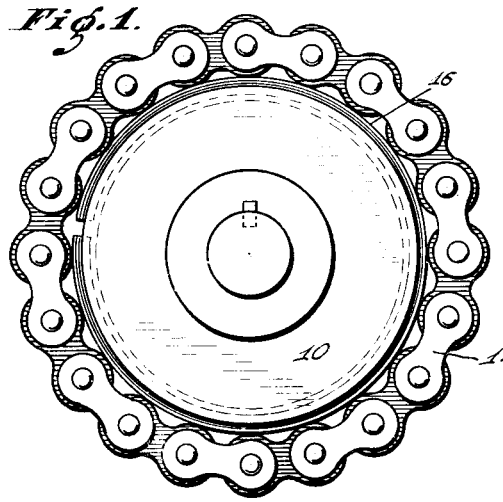
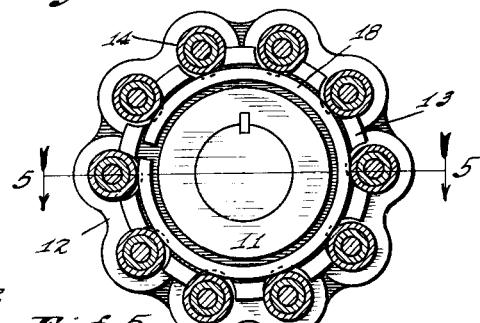
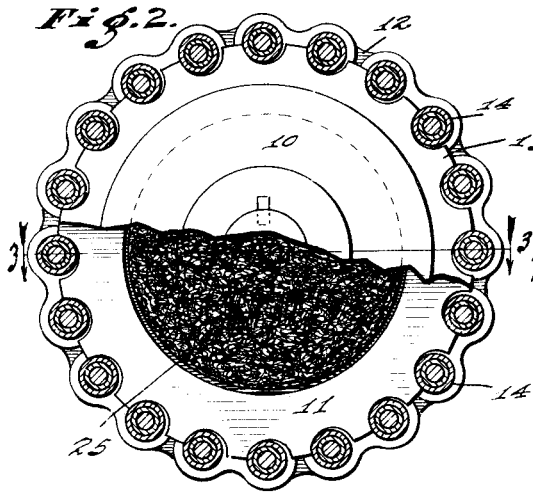
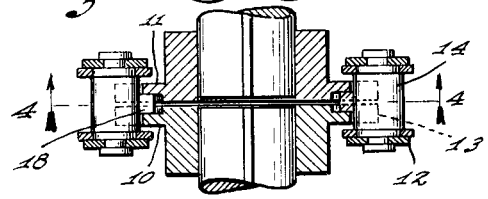
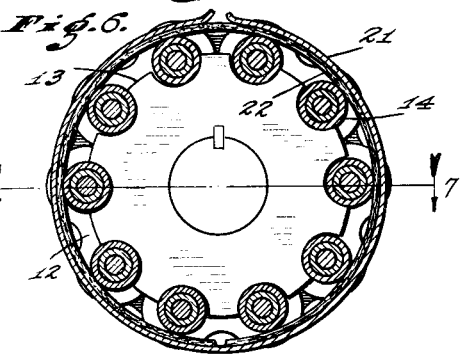
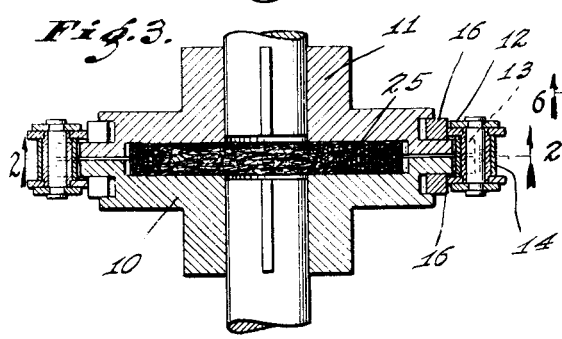
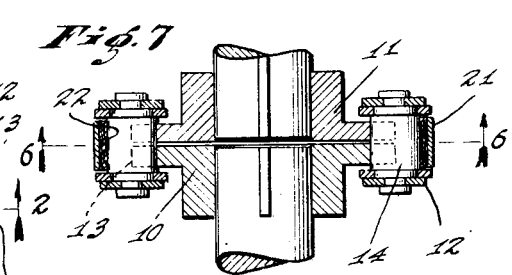
Inventor
OLIVER H. GALLAMORE, Patented Jan. 16, 1934

1,943,791

UNITED STATES PATENT OFFICE 1,943,791

FLEXIBLE COUPLING

Oliver Herbert Gallamore, Indianapolis, Ind., assignor to Diamond Chain and Manufacturing Company, Indianapolis, Ind., a corporation of Indiana Application December 19, 1930
Serial No. 503,411

9 Claims. (Cl. 64—97)

My invention is concerned with flexible shaft couplings of the type embodying a pair of approximately co-axial sprockets interconnected by means of an encircling chain. A coupling of this general type is shown and described in the Clark Patent No. 1,147,373.

In a coupling of this general type, the driving effort transferred from the driving element of the coupling to the chain and from the chain to the driven element is not distributed evenly throughout the circumference of the chain but is largely localized, the driving effort being transmitted from the driving coupling element to the chain at a point substantially diametrically opposite that at which the driving effort is transmitted from the chain to the driven element. At the points where this transfer of driving effort between the chain and coupling members occurs, the reaction of the sprocket-teeth on the teeth-engaging elements of the chain tends to force the chain radially outward, thus distorting it from the desired circular form. In consequence, each tooth-engaging element of the chain, forced outward by tooth-reaction at the point where the driving effort is transferred from the chain to the driven member, is moved radially on the engaging tooth-face as the result of tension in the chain as such element passes circumferentially toward the point where the driving effort is transmitted to the chain from the driving member of the coupling. As it approaches this latter point, it is again forced outward by the reaction of the tooth engaging it. This radial movement of the teeth-engaging elements of the chain is objectionable in that it results in vibration and noise and creates wear.

It is the object of my invention to provide a coupling of the type referred to with means tending to prevent this radial movement of the teeth-engaging elements of the chain, and thus to decrease wear and largely eliminate vibration and noise.

A further object of my invention is to provide means for lubricating the coupling and for preventing noise resulting from engagement of the driving and driven members of the coupling.

In carrying out my invention, I provide the coupling with means tending to maintain the flexible chain in circular form in opposition to the driving forces which, as set forth above, tend to distort the chain. Preferably, although not necessarily, this means takes the form of a resilient element which acts directly on the chain and, at circumferentially spaced points, exerts a radial pressure thereon.

To provide for lubrication of the coupling and to prevent noise which might result from engagement of the two coupling members, I provide between the adjacent faces of such coupling members a pad of absorbent material which serves to carry a supply of lubricant and as a cushion preventing engagement of the two coupling members.

The accompanying drawing illustrates my invention: Fig. 1 is an end elevation of one form of coupling; Fig. 2 is a transverse section through such coupling on the line 2—2 of Fig. 3, with part of one coupling member broken away; Fig. 3 is an axial section on the line 3—3 of Fig. 2; Fig. 4 is a transverse section on the line 4—4 of Fig. 5, illustrating a modified form of coupling; Fig. 5 is an axial section on the line 5—5 of Fig. 4; Fig. 6 is a transverse section on the line 6—6 of Fig. 7, showing another modified form of couplings; and Fig. 7 is an axial section on the line 7—7 of Fig. 6.

As illustrated in the drawing, the coupling comprises driving and driven members 10 and 11 and a flexible chain 12. The two members 10 and 11 are each provided with an annular series of teeth 13, the spaces between which receive rollers 14 or other cross-members of the chain 12. The rollers, extending between the clutch members, serve to drive one from the other.

As pointed out above, the action of the teeth 13 on the rollers 14 tends to distort the chain from a true circular form, thus introducing unnecessary friction between the engaging surfaces of the teeth and rollers, which results in wear and decreased efficiency. To prevent this action, I provide the coupling with a yielding means which acts on the chain and tends to hold it in circular form to prevent or at least decrease the radial movement of the chain-rollers 14 on the teeth 13.

The yielding means just refer ed to make take various forms. In the form illustrated in Figs. 1, 2, and 3, each of the clutch members 10 and 11 is provided adjacent its teeth with an annular groove for the reception of a split spring ring 16 which is so formed that when in place it bears against the inner edges of the chain side-members tending to expand the chain-loop. The outer surfaces of the ring 16 are substantially circular, so that the rings, by their action on the chain, tend to maintain the chain in circular form in opposition to the forces transferred between the teeth 13 and rollers 14.

The coupling illustrated in Figs. 4 and 5, instead of embodying two split spring rings acting on the chain side-members at the sides of the chain, has a single split-spring ring 18 which acts on the chain-rollers 14 at approximately their mid-point. In this form of coupling, the coupling members 10 are provided in their adjacent faces with annular grooves. The outer diameter of each of these grooves is larger than the base diameter of the series of teeth on the coupling members, as is clear from Fig. 4; and the ring 18, which lies in the grooves may therefore bear against the rollers 14. Like the rings 16 illustrated in Figs. 1 and 3, the ring 18 is contracted when in place and exerts outwardly directed radial forces at spaced points along the circumference of the chain, thus tending to hold the chain in circular form.

In the coupling shown in Figs. 6 and 7, I place around the chain a spring ring 21 which overlies the chain-rollers 14. The ring 21, when in place, is expanded from its normal diameter, so that it exerts an inwardly directed radial force on each of the rollers 14, thus tending to force the rollers to the bottoms of the spaces between the teeth 13 and thereby to maintain the chain in circular form. To prevent noise and wear, a strip of felt 22 or similar cushioning material may be interposed between the ring 21 and the rollers 14.

In all the modifications described, it will be apparent that the yielding means comprised by the various forms of split spring rings tend to hold the chain in the desired circular form, thus decreasing if not eliminating radial movement of the rollers 14 relative to the teeth 13 which respectively engage them. As has been pointed out above, this action of the split spring rings, by eliminating wear on the engaging faces of the rollers and teeth, increases the life of the coupling and makes it more silent in operation.

I am not the first to associate a spring with the chain of a coupling of the type illustrated and described in this application, as such a spring is broadly disclosed in the Clark Patent No. 1,310,002. My spring differs from the spring of that patent, however, in that it tends to hold the chain in circular form while the spring of the Clark patent tends to distort the chain from circular form.

It sometimes happens that because of end play in the shafts or other members which the coupling interconnects there is a possibility that the coupling members may move back and forth axially relative to each other producing disagreeable noise when they come in contact. To prevent the possibility of this, I may provide between the two coupling members a cushion, conveniently in the form of a felt disk 25, which may be received in mating recesses in the adjacent faces of the two coupling members.

The disk 25, in addition to serving as a cushion preventing interengagement of the two coupling members, may be saturated with lubricant to provide for the lubrication of the coupling.

I claim as my invention:

1. A flexible coupling, comprising two rotatable coupling members, each of said coupling members having an annular series of teeth, a chain encircling said members and provided with transverse parts adapted to be received in the spaces between said teeth to drive one member from the other, and a split spring ring located within said chain, said ring acting on said chain at angularly spaced points and tending to hold said chain in circular form.

2. A flexible coupling, comprising two rotatable coupling members, each of said coupling members having an annular series of teeth, a chain encircling said members and provided with transverse parts adapted to be received in the spaces between said teeth to drive one member from the other, and a split spring ring, said ring acting on said chain at angularly spaced points and tending to hold said chain in circular form.

3. A flexible coupling, comprising two rotatable coupling members, each of said coupling members having an annular series of teeth, means operatively interconnecting said two members including a plurality of parts disposed in the spaces between said teeth and extending from one member to the other to transmit torque between them, and a split spring ring acting on said parts and tending to oppose relative radial movement between them and the teeth they respectively engage.

4. A flexible coupling, comprising two rotatable coupling members, each of said coupling members having an annular series of teeth, a chain encircling said members, said chain comprising a series of transverse parts of the chain being disposed in the spaces between said teeth to drive one member from the other, and a split spring ring exerting outward radial pressure on said transverse parts and tending thereby to hold the chain in circular form.

5. A flexible coupling, comprising two rotatable coupling members, each of said coupling members having an annular series of teeth, a chain encircling said members, said chain comprising a series of transverse parts of the chain being disposed in the spaces between said teeth to drive one member from the other, and a split spring ring exerting outward radial pressure on said side-bars and tending thereby to hold the chain in circular form.

6. A flexible coupling, comprising two rotatable coupling members, each of said coupling members having an annular series of teeth, a chain encircling said members, said chain comprising a series of transverse parts of the chain being disposed in the spaces between said teeth to drive one member from the other, and a split spring ring exerting inward radial pressure on said transverse parts and tending thereby to hold the chain in circular form.

7. A flexible coupling, comprising two rotatable coupling members, each of said coupling members having an annular series of teeth, a chain encircling said members and provided with transverse parts adapted to be received in the spaces between said teeth to drive one member from the other, and yielding means exerting inwardly directed radial forces on said chain at spaced points and tending thereby to hold it in circular form.

8. A flexible coupling, comprising two rotatable coupling members, each of said coupling members having an annular series of teeth, a chain encircling said members and provided with transverse parts adapted to be received in the spaces between said teeth to drive one member from the other, and yielding means exerting outwardly directed radial forces on said chain at spaced points and tending thereby to hold it in circular form.

9. A flexible coupling, comprising two rotatable coupling members, means operatively interconnecting said coupling members to drive one from the other, and a pad of yielding absorbent material located between said two members to prevent them from coming into contact with each other, said pad being saturated with lubricant.

OLIVER HERBERT GALLAMORE.